US010325163B2

United States Patent
Perez Barrera et al.

(10) Patent No.: US 10,325,163 B2
(45) Date of Patent: Jun. 18, 2019

(54) VEHICLE VISION

(71) Applicant: Ford Global Technologies, LLC, Dearborn, MI (US)

(72) Inventors: Oswaldo Perez Barrera, Texcoco (MX); Alvaro Jimenez Hernandez, Miguel Hidalgo (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 8 days.

(21) Appl. No.: 15/358,402

(22) Filed: Nov. 22, 2016

(65) Prior Publication Data

US 2018/0144199 A1    May 24, 2018

(51) Int. Cl.
G06K 9/00 (2006.01)
G06K 9/46 (2006.01)

(52) U.S. Cl.
CPC ....... G06K 9/00805 (2013.01); G06K 9/4652 (2013.01)

(58) Field of Classification Search
CPC .................................................. G06K 9/4652
See application file for complete search history.

(56) References Cited

U.S. PATENT DOCUMENTS

| 8,373,754 B2 | 2/2013 | Keuhnle et al. |
| 8,755,634 B2 | 6/2014 | Takahashi |
| 2010/0254595 A1* | 10/2010 | Miyamoto ........... G06K 9/2036 382/159 |
| 2013/0147957 A1* | 6/2013 | Stein ...................... G01B 11/02 348/148 |
| 2014/0085475 A1* | 3/2014 | Bhanu ................ G06K 9/00825 348/148 |
| 2015/0070394 A1* | 3/2015 | Yanagawa ............ G06T 3/0018 345/649 |
| 2015/0291097 A1* | 10/2015 | O'Cualain ................ B60R 1/00 348/148 |
| 2015/0371096 A1* | 12/2015 | Stein ...................... G06T 7/248 382/103 |
| 2016/0341558 A1* | 11/2016 | Lee ......................... G01C 21/30 |
| 2018/0225529 A1* | 8/2018 | Stein ...................... G06T 7/248 |

FOREIGN PATENT DOCUMENTS

| CN | 105701844 A | 6/2016 |
| JP | 2004200864 A | 7/2004 |
| WO | WO 2010029592 A1 | 3/2010 |

OTHER PUBLICATIONS

Schiopu, Ionut, et al., "Pothole Detection and Tracking in Car Video Sequence," Jun. 2016.

* cited by examiner

*Primary Examiner* — Oneal R Mistry
(74) *Attorney, Agent, or Firm* — Frank A. MacKenzie; Bejin Bieneman PLC

(57) ABSTRACT

A computer is programmed to detect an object based on vehicle camera image data. The computer determines a light source and determines, based in part on a light source position, that the detected object is a shadow. The computer then navigates the vehicle without avoiding the object upon determining that the detected object is a shadow.

16 Claims, 4 Drawing Sheets

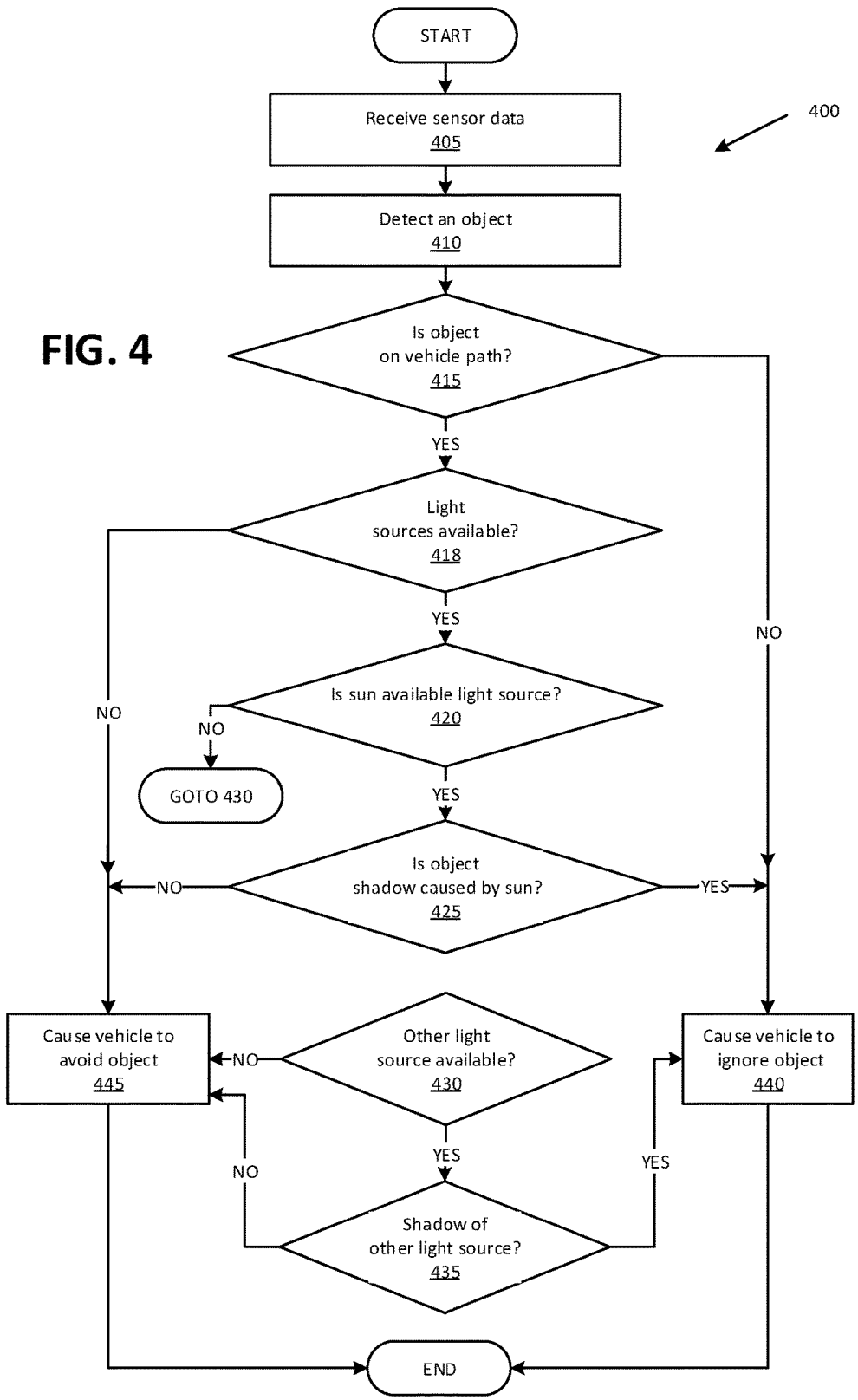

VEHICLE VISION

BACKGROUND

A vehicle may include one or more camera sensors to detect objects, e.g., in an area in front of the vehicle. The camera sensors may provide data including a position of the detected objects, e.g., obstacles, relative to the vehicle. The provided data can be used for various vehicle operations such as a collision avoidance. However, sometimes an object is falsely detected, e.g., when an image from a camera sensor is interpreted to indicate an object when no object is present and/or when an object is present but in a different location and/or orientation than indicated by interpreting the sensor data. Where a vehicle relies on object detection for various operations, e.g., automatic braking, steering, and/or throttle control to avoid a collision with a detected object, a false detection can cause the vehicle to operate in a dangerous manner.

BRIEF DESCRIPTION OF THE DRAWINGS

FIG. 4 is a flowchart of an exemplary process for distinguishing shadows from objects on a vehicle path.

DETAILED DESCRIPTION

Introduction

Figure 1:
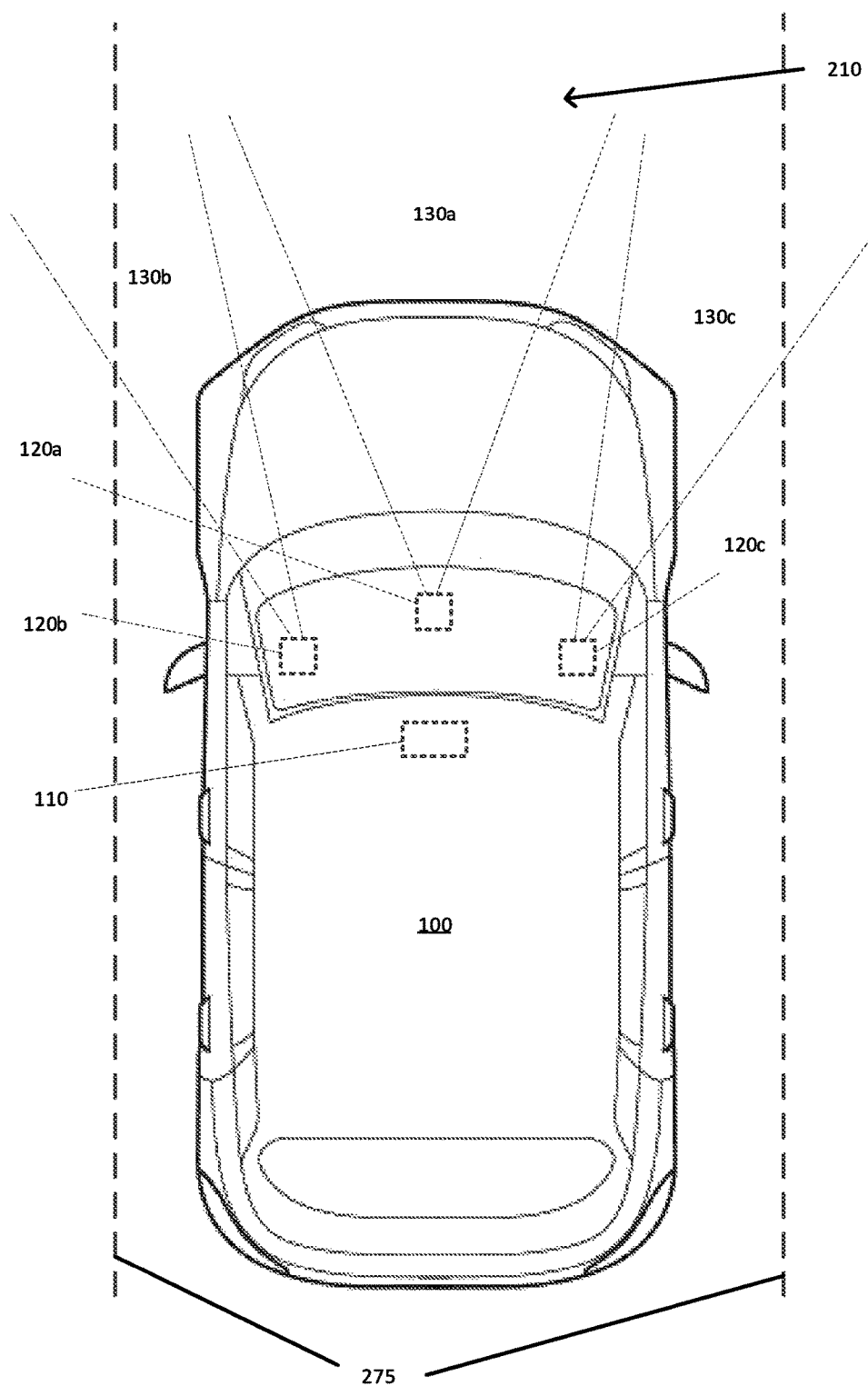
FIG. 1 is a diagram of an exemplary vehicle with multiple camera sensors and a computer.
Figure 2:
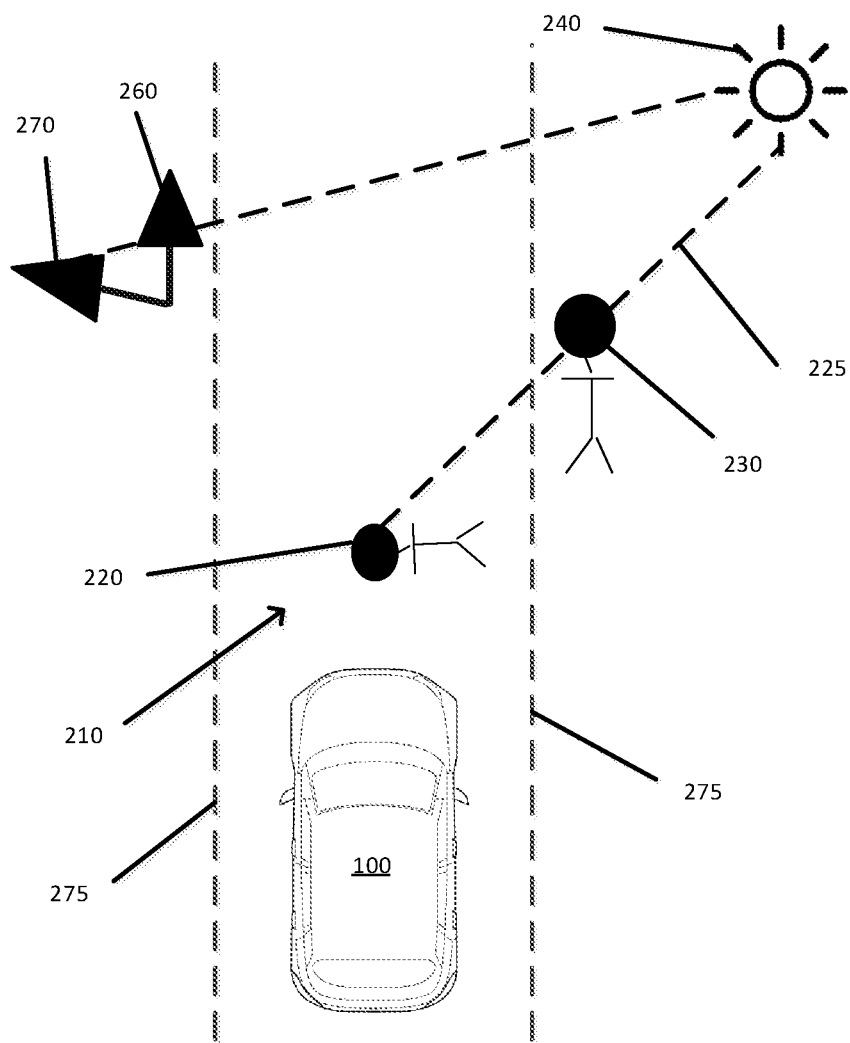
FIG. 2 is a top view of the vehicle of FIG. 1 detecting objects in a surrounding area.

Referring to FIGS. 1 and 2, a host vehicle 100 computer 110 is programmed to detect an object based on vehicle 100 camera 120 image data. The computer 110 determines a light source and determines, based in part on a light source position, whether the detected object is a shadow object 220 or a physical object 230. The computer 110 can make this determination based on image data received from vehicle 100 cameras such as a front view camera 120a, side view cameras 120b, 120c, and/or surround view cameras, etc. The computer 110 then can navigate the vehicle 100 to avoid physical objects 230, but without taking evasive action concerning shadows 220.

For convenience, shadow objects 220 may be referred to herein as "shadows 220," i.e., visually observable shapes on a physical surface such as a roadway caused by a physical object situated between the physical surface and a light source. Any reference to an object 230 should be understood as referring to a physical object 230, i.e., a tangible object composed of physical matter and having length, width, and breadth.

System Elements

FIG. 1 illustrates a vehicle 100 including a computer 110, one or more camera sensors 120a, 120b, 120c for providing image data from an exterior area of the vehicle 100, e.g., an area in front of the vehicle 100.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., sensor, actuators, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

The vehicle 100 may include one or more vision sensors such as camera sensors 120a, 120b, 120c. A camera sensor 120 is an electronic sensor for obtaining a digital image such as is known. Each camera sensor 120 has a field of view 130. The camera sensors 120a, 120b, 120c capture image data from fields of view 130a, 130b, 130c respectively. A field of view 130 may include an area in front of the vehicle 100 (i.e. in a forward moving direction of the vehicle 100), a rear area of the vehicle 100 (i.e., an area in a reverse moving direction of the vehicle 100), and/or an area on a side of the vehicle 100. In one example, the fields of view 130 may together provide a view of an entire surrounding of the vehicle 100. The fields of view 130 may overlap, e.g., the fields of view 130a, 130b partially overlap. Using image processing techniques, the computer 110 may detect objects in the fields of view 130. For example, the computer 110 may detect obstacles based on image data received from a forward facing camera sensors 120b. Cameras 120 can be used to detect objects 220, 230 (discussed further below with respect to FIG. 2.)

Actuators of the first vehicle 100 are implemented via circuits, chips, or other electronic components that can actuate various vehicle subsystems in accordance with appropriate control signals as is known. The actuators may be used to control braking, acceleration, and steering of the first vehicle 100. As an example, the first vehicle 100 computer 110 may detect an obstacle in front of the vehicle 100 and output control instructions to brake actuators to avoid a collision with the detected obstacle.

In addition, the computer 110 may be configured for communicating through a wireless communication interface to communicate with other computers, e.g., a remote server computer. The wireless communication network represents one or more mechanisms by which the computer 110 of vehicle 100 may communicate with other computers, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized).

FIG. 2 illustrates a top view of the vehicle 100 driving on a path 210, e.g., a road lane with lane markings 275. Fields of view 130 (see FIG. 1) of vehicle 100 camera sensors 120 may include a vehicle 100 path 210 and other areas such as other road lanes, pedestrian walkways along the road, etc. The computer 110 may be further programmed to identify a projected path, e.g., the path 210, of the vehicle 100 and determine whether a detected object is a shadow 220 if the computer 110 determines that the detected object is on the projected path 210.

In one example, the computer 110 may be programmed to identify the projected path 210 based on a vehicle 100 position, a vehicle 100 orientation, and at least two of a vehicle 100 yaw rate, a vehicle 100 steering angle, and a vehicle 100 speed. For example, a projected path 210 may be defined as a polynomial of third degree such as $Y=aX+bX^2+cX^3$. In this polynomial, Y and X represent longitudinal and lateral coordinates, e.g., GPS (global position system) location coordinates. Parameters a, b, and c of such a polynomial may determine a path 210 curvature. Additionally, the projected path 210 may be associated with a width, e.g., based on a width of the vehicle 100. Additionally or alternatively, the computer 110 may be programmed to identify the path 210 based on camera 120 image data, i.e., the computer 110 may detect lane markings 275 using image processing techniques such as are known. Thus, the computer 110 may identify a lane defined by an area between the lane markings 275 as the vehicle path 210.

To determine whether a detected object is on the projected path 210, i.e., within an area covered by the projected path 210, as one example, the computer 110 may determine coordinates of a detected object relative to the vehicle 100 and determine whether the coordinates are within an area defined by the projected path 210.

The vehicle 100 cannot accurately navigate when a shadow 220 is falsely detected as an object 230. The vehicle 100 computer 110 is programmed to detect objects 230 so that objects 230 can be avoided or properly addressed during navigation of the vehicle 100, e.g., the vehicle 100 may need to slow for a pothole object 230, but not for a shadow 220 of a person object 230. The present disclosure addresses the problem of the computer 110 basing vehicle 100 navigation on incorrect determinations of cameras 120, e.g., the computer 110 may unnecessarily actuate vehicle 100 brakes to avoid a shadow 220 due to a false detection. Navigation based on false information may lead to dangerous driving conditions, e.g., sudden and unnecessary braking can result in a rear-end impact with another vehicle following the vehicle 100. To avoid false object 230 detection, the computer 110 can be programmed to detect a shadow 220 by determining a position of the sun 240 based on a date, a time, and a position of the vehicle 100, and then determining, based in part on the position of the sun 240, whether the detected object is a shadow 220, e.g., a shadow 220 of a pedestrian object 230, or whether the detected object is in fact an object 230 for potential evasive action, e.g., a pothole object 230, a pedestrian object 230, etc. The computer 110 can further be programmed to navigate the vehicle 100 without evasive action upon determining that the detected object is a shadow 220.

In one example, the computer 110 may be further programmed to determine that a detected object is a shadow 220 upon determining, based on the vehicle 100 camera 120 image data, that a first luminance of an object image is less than a second luminance of an area surrounding the object image, i.e., the detected object is darker than a surrounding area such as a surface of the path 210, and therefore is likely a shadow 220.

In a further example, to determine whether a detected object is a shadow 220, the computer 110 may be programmed to determine whether the object is located on a line 225 between the sun 240 and a physical object 230, which means that the detected object is likely to be a shadow 220. The computer 110 may detect the physical object 230 based on data received from vehicle 100 sensors such as the camera sensors 120, LIDAR sensors, and/or radar sensors.

As another example for determining whether the detected object is a shadow 220, the computer 110 may be further programmed to determine a shape of a detected object using image analysis techniques such as are known. Based on a determined shape, e.g., a circle, a detected object can be determined to be a shadow 220, i.e., in this case, a projection, of a second detected object determined to be a physical object 230. For example, a projection of a circle may cause a circle shaped shadow or a shadow of a triangular traffic sign 260 may cause a triangular shaped shadow 270.

In one example, the computer 110 may be programmed to receive the position of the sun 240 by receiving vehicle 100 position data from a vehicle 100 sensor, transmitting the vehicle 100 position data to a second computer, e.g., a remote server, and receive the position of the sun 240 from the second computer. The second computer may store and/or calculate the position of the sun 240 based on the position of the vehicle 100 such as GPS location coordinates, a current date, and a current time using techniques as are known. Additionally or alternatively, the vehicle 100 computer 110 may be programmed to calculate the position of the sun 240. For example, the position of the sun 240 may be defined in a three-dimensional coordinate system, e.g., with reference to the vehicle 100 position.

Figure 3:
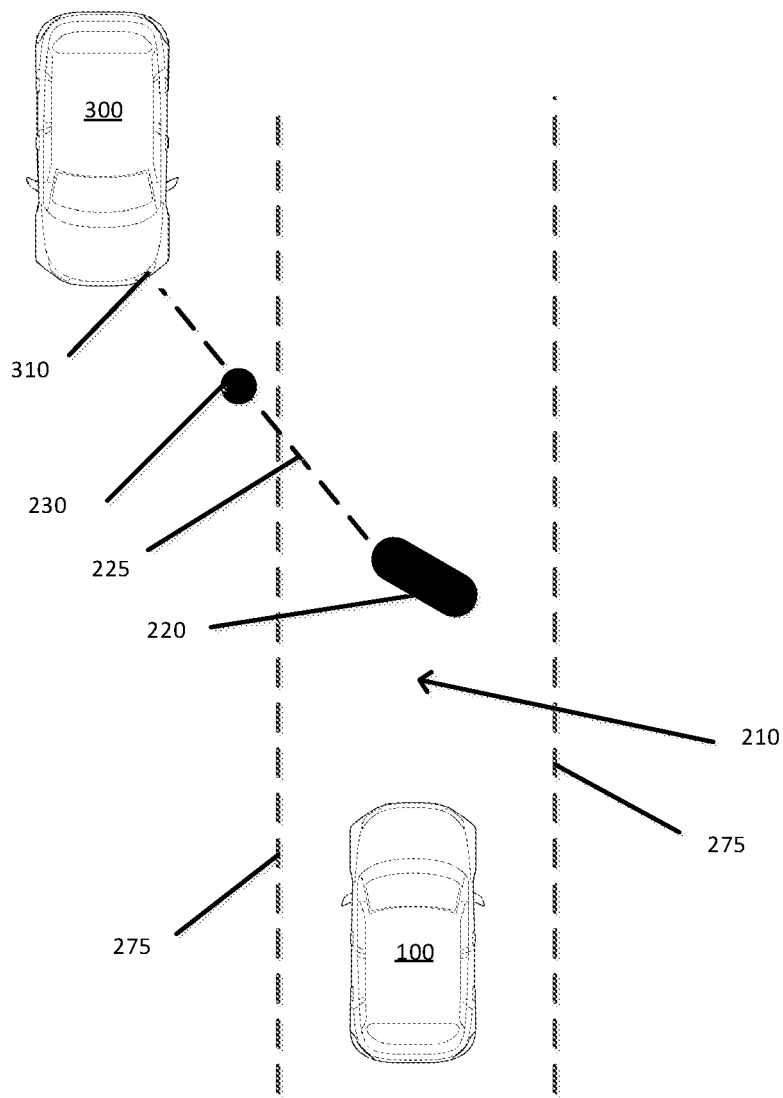
FIG. 3 is another top view of the vehicle of FIG. 2 detecting a shadow caused by a front light of a second vehicle.

As shown in FIG. 3, light sources other than the sun 240 can also cause shadows that can falsely be detected by the vehicle 100 computer 110 as objects, e.g., a shadow object 220 caused by a second vehicle 300 front light 310. The vehicle 100 computer 110 may be programmed to determine whether the detected object 220 is a shadow caused by a light source other than the sun 240, e.g., the second vehicle 300 front light 310. For example, the computer 110 can be programmed to determine whether the physical object 230 casts the shadow 220 based on a position of the light source different than the sun, a vehicle 100 position, an object 220 position, and a physical object 230 position. In an example, to determine whether a detected object is a shadow 220, the computer 110 may be programmed to determine whether the detected object is located on a line 225 between a physical object 230 and the light source other than the sun 240, e.g., the second vehicle 300 front light 310. In a further example, the light source other than the sun 240 may be a traffic light, a building light, or other light sources in an area surrounding the vehicle 100.

In one example, the computer 110 can be further programmed to determine whether the physical object 230 casts the shadow 220 based on a speed of the second vehicle 300. For example, as shown in FIG. 3, the second vehicle 300 may move relative to the physical object 230, e.g., in an opposite direction relative to a direction of travel of the vehicle 100. Therefore, the shadow object 220 may move relative to the physical object 230, e.g., in a direction opposite the direction of movement of the second vehicle 300. The computer 110 may determine the speed of the second vehicle 300 using image processing techniques, such as are known.

Process

FIG. 4 illustrates an exemplary process 400 for distinguishing shadows 220 from physical objects 230 on a vehicle 100 path 210, as shown in FIG. 2. For example, the vehicle 100 computer 110 can be programmed to execute blocks of the process 400.

The process 400 begins in a block 405, in which the computer 110 receives data from vehicle 100 sensors, e.g., image data from camera sensor(s) 120 such as a front facing camera 120b, and/or object data from other object detection sensors such as LIDAR sensors, radar sensors, etc.

Next, in a block 410, using image processing techniques as such are known, the computer 110 may detect an object based on the image data received from the vehicle 100 camera sensor(s) 120. For example, the computer 110 may output data including coordinates of the detected object relative to a vehicle 100 position, a size/shape of the detected object 220, etc.

Next, in a block 415, the computer 110 determines whether a detected object 220 is on (e.g., is within a predetermined distance of a path centerline) the vehicle 100 path 210. The computer 110 may be further programmed to identify a projected path 210 of the vehicle 100 and to determine whether the detected object is a shadow 220 upon determining that the detected object is on the projected path 210 of the vehicle 100 (see FIG. 2). In one example, the computer 110 may identify the projected path 210 using known techniques, e.g., based on one or more of a vehicle 100 position, a vehicle orientation (e.g., direction of vehicle 100 longitudinal axis), a vehicle 100 yaw rate, a vehicle 100 steering angle, and/or a vehicle 100 speed. In another example, the computer 110 may identify the projected path 210 based on the vehicle 100 camera 120 image data, e.g., using image processing techniques such as are known. The computer 110 then determines that the detected object is on the projected path 210 of the vehicle 100 by determining coordinates of the detected object relative to the vehicle 100 and determining whether the coordinates of the detected object are within an area covered by the projected path 210. If the computer 110 determines that the detected object is on the vehicle 100 path 210, then the process 400 proceeds to a decision block 418; otherwise the process 400 proceeds to a block 440.

In the decision block 418, the computer 110 determines whether it can identify one or more light sources, e.g., sun 240, a second vehicle 300 light 310, moon, a building light, a street light, a bike's light, etc. The computer 110 may identify the light sources based on data received from the vehicle 100 sensors, e.g., image data from the camera sensor(s) 120 and/or data received from a remote computer, e.g., a remote computer providing data including a location, etc. of a street light. Additionally or alternatively, the computer 110 may determine the light sources such as the sun 240, the moon, etc., based on a date, a time, and a location of the vehicle 100, as discussed above. It is possible that the computer 110 may identify zero light sources, e.g., based on a time of day, e.g., night, it may be determined that no light sources external to a vehicle 100, e.g., other than vehicle 100 headlamps, are available. If the computer 110 identifies one or more light sources, then the process 400 proceeds to a decision block 420; otherwise the process 400 proceeds to a block 445.

In the decision block 420, which may follow the block 418, the computer 110 determines whether the sun 240 is an available light source, e.g., based on a current position of the sun 240. In one example, the computer 110 determines a current position of the sun 240 based on a time of day. In another example, a vehicle 100 camera 120 could detect the sun 240. In either case, the computer 110 could determine that the sun 240 is an available light source, or that it is not, e.g., based on a time of day and/or because vehicle 100 sensors 120 cannot detect the sun, e.g., because the vehicle 100 is surrounded by buildings or other structures in an urban environment, because of clouds or fog, etc.

Assuming a sun position can be determined, the computer 110 may be programmed to calculate the current position of the sun 240, e.g., in a three dimensional coordinate system having its origin at a center point of the vehicle 100, based on a current time, a current date, and a vehicle 100 position, e.g., as indicated by GPS location coordinates. In another example, the computer 110 may transmit, via a wireless communication interface of the vehicle 100, data indicating the vehicle 100 location and orientation (e.g., facing due north, etc.) to a remote computer. The computer 110 can then receive a reply from the remote computer including the position of the sun 240. Additionally, the computer 110 may be programmed to detect the sun 240 based on image data received from the vehicle 100 camera(s) 120 using image processing techniques, such as are known. Thus, the computer 110 may then determine the sun 240 position according to coordinates as described above. If the computer 110 determines that the sun 240 is available as a light source, then the process 400 proceeds to a decision block 425; otherwise the process 400 proceeds to a decision block 430.

In the decision block 425, the computer 110 determines based in part on the position of the sun 240 whether the detected object is a shadow 220 caused by the sun 240. For example, to determine whether the detected object is a shadow 220, the computer 110 may be programmed to determine whether the detected object is located on a line 225 between the sun 240 and a second object 230 casting the shadow 220. The computer 110 may detect the second object 230 based on data received from, e.g., a camera sensor 120 such as a surround view camera 120c, a LIDAR sensor, and/or a radar sensor. As another example, the computer 110 may determine whether the detected object is a shadow 220 by determining a shape of the detected object, detecting a second physical object 230, determining a second shape of the second physical object 230, and determining whether the shape is a projection of the second shape caused by the sun 240. For example, a projection of a triangular shaped physical object 260 may cause a triangular shaped shadow 270. In one example, the computer 110 can be programmed to determine whether the shape is a projection of the second shape based on attributes such as size, number of edges, etc. of the shape and the second shape. For example, a rectangle shape having four edges or a circular shape without an edge may not be a projection of a triangular second shape having three edges. In another example, the computer 110 can be programmed to determine whether the shape is a projection of the second shape based on a size of the shape, a second size of the second shape, a second distance between the shape and the second shape, and a distance between the light source and the second shape.

A shadow area may be darker than an area surrounding the shadow area. As one example, additionally, the computer 110 may be programmed to determine whether the detected object is a shadow 220 if the computer 110 determines that a first luminance of the detected object is less than a second luminance of an area surrounding the detected object. For example, the computer 110 may identify the first and second luminance based on the image data received from the vehicle 100 camera sensor(s) 120. Thus, advantageously, the computer 110 may avoid using computational resources to determine whether the detected object is a shadow 220, when the detected object is brighter than the area surrounding the detected object, i.e. that is unlikely that the detected object is a shadow.

If the computer 110 determines in the block 425 that the detected object is a shadow 220 caused by the sun 240, then the process 400 proceeds to the block 440; otherwise the process 400 proceeds to the block 445.

In the decision block 430, the computer 110 determines whether a light source different from the sun 240, e.g., a second vehicle 300 front light 310, is detected (see FIG. 3). For example, the computer 110 may detect the light source different than the sun 240 based on image data received from the vehicle 100 camera sensors 120, using image processing techniques such as are known. If the computer 110 detects the light source different than the sun 240, then the process 400 proceeds to a decision block 435; otherwise the process 400 proceeds to the block 445.

In the decision block 435, the computer 110 determines whether the detected object is the shadow 220 caused by the light source other than the sun 240, e.g., the second vehicle 300 light 310 (see FIG. 3). For example, the computer 110 may determine a position of the vehicle 300 light 310, detect a physical object 230, and determine whether the second physical object 230 casts the shadow 220, e.g., based at least on a position of the vehicle 300 light 310. The light source other than the sun 240 may further include street lights, traffic lights, building light fixtures, etc. To determine the position of the light source, the computer 110 may detect the light source, e.g., the vehicle 300 light 310, based on vehicle 100 camera 120 image data. The computer 110 can then determine the position of the light source.

In another example, when the light source, e.g., the vehicle 300 light 310, moves relative to the physical object 230, the computer 110 may determine whether the physical object 230 casts the shadow 220 based on a speed of the light source, e.g., a second vehicle 300 speed. In yet another example, the computer 110 may determine whether the physical object 230 casts the shadow 220 by determining whether the object 220 is located on a line 225 between the light source, e.g., the vehicle 300 light 310, and the object 230 casting the shadow 220. For example, the computer 110 may determine whether the physical object 230 casts the shadow 220 based on the position of the light source different than the sun, e.g., the vehicle 300 light 310, an object 220 position, and a physical object 230 position. If the computer 110 determines that the detected object is a shadow 220 caused by the light source other than sun 240, then the process 400 proceeds to the block 440; otherwise the process 400 proceeds to the block 445.

In the block 440, the computer 110 having determined in one of the decision blocks 425, 435 that the detected object is a shadow 220, or that the detected object is not on the vehicle 100 path 210 in the decision block 415, the computer 110 navigates the vehicle 100 without avoiding the detected object, i.e., the detected shadow 220.

In the block 445, the computer 110 having determined in the decision blocks 430, 435 that the detected object is something other than a shadow 220, the computer 110 navigates the vehicle 100 to avoid the detected object. For example, the computer 110 may output control instructions to brake actuators to avoid a collision with the detected objects.

Following the blocks 440, 445, the process 400 ends, or returns to the block 405, although not shown in the process 400.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer for a vehicle, programmed to:
   detect a first and a second object based on an image from a camera in the vehicle;
   identify a third object including a light source;
   identify a projected path of the vehicle;
   determine that the first object is on the projected path of the vehicle based on the vehicle camera image by calculating a set of coordinates of the first object relative to the vehicle and determining whether the coordinates of the first object are within an area covered by the projected path, and further determine, based on a moving speed and a position of the third object including the light source and a speed of the second object, that the first object is a shadow of the second object; and
   navigate the vehicle without avoiding the detected shadow of the second object.

2. The computer of claim 1, wherein the third object is a second vehicle.

3. The computer of claim 1, further programmed to determine that the first object is the shadow based on a first luminance of the first object being less than a second luminance of an area surrounding the first object in the image.

4. The computer of claim 1, further programmed to identify the projected path based on a vehicle position, a vehicle orientation, and at least two of a vehicle yaw rate, a vehicle steering angle, and a vehicle speed.

5. The computer of claim 1, further programmed to determine that the first object is the shadow by determining whether the object is located on a line between the light source and a second object casting the shadow.

6. The computer of claim 1, further programmed to determine whether the first object is the shadow by:
   determining a first shape of the first object;
   determining a second shape of the second object; and
   determining whether the first shape is a projection of the second shape caused by the light source.

7. The computer of claim 1, further programmed to navigate the vehicle without avoiding the first object in response to determining a lack of a second object, wherein the first object is the shadow of the second object.

8. The computer of claim 1, further programmed to receive the position of the light source by:
   detecting the third object based on vehicle camera image data; and
   determining the position of the detected third object.

9. A method carried out in a vehicle, comprising:
   detecting a first and a second object based on an image from a camera in the vehicle;
   identifying a third object including a light source;
   identifying a projected path of the vehicle;
   determining that the first object is on the projected path of the vehicle based on the vehicle camera image by calculating a set of coordinates of the first object relative to the vehicle and determining whether the coordinates of the first object are within an area covered by the projected path, and further determining, based on a moving speed and a position of the third object including the light source and a speed of the second object, that the first object is a shadow of the second object; and
   navigating the vehicle without avoiding the detected shadow of the second object.

10. The method of claim 9, wherein the third object is a second vehicle.

11. The method of claim 9, further comprising determining that the first object is the shadow based on a first luminance of the first object being less than a second luminance of an area surrounding the first object in the image.

12. The method of claim 9, further comprising identifying the projected path based on a vehicle position, a vehicle orientation, and at least two of a vehicle yaw rate, a vehicle steering angle, and a vehicle speed.

13. The method of claim 9, further comprising determining that the second object casts the shadow based on a speed of a second vehicle.

14. The method of claim 9, further comprising determining whether the first object is the shadow by:
   determining a first shape of the first object;
   determining a second shape of the second object; and
   determining whether the first shape is a projection of the second shape caused by the light source.

15. The method of claim 9, further comprising navigating the vehicle without avoiding the first object in response to determining a lack of a second object, wherein the first object is the shadow of the second object.

16. The method of claim 9, further programmed to receive the position of the light source by:
   detecting the third object based on vehicle camera image data; and
   determining the position of the detected third object.

* * * * *